United States Patent [19]
Gollwitzer

[11] Patent Number: 4,513,999
[45] Date of Patent: Apr. 30, 1985

[54] CASSETTE FASTENING STRUCTURE

[75] Inventor: Reiner Gollwitzer, Augsburg, Fed. Rep. of Germany

[73] Assignee: Regogollwitzer GmbH and Co. KG, Fed. Rep. of Germany

[21] Appl. No.: 252,479

[22] Filed: Apr. 9, 1981

Related U.S. Application Data

[63] Continuation of Ser. No. 164,377, Jun. 30, 1980, abandoned, which is a continuation of Ser. No. 29,408, Apr. 12, 1979, abandoned, which is a continuation of Ser. No. 939,611, Sep. 5, 1978, abandoned, which is a continuation of Ser. No. 745,679, Nov. 29, 1976, abandoned.

[30] Foreign Application Priority Data

Nov. 28, 1975 [DE] Fed. Rep. of Germany ....... 2553671
Feb. 18, 1976 [DE] Fed. Rep. of Germany ....... 7604823

[51] Int. Cl.³ ................... E05C 1/16; A45C 13/10
[52] U.S. Cl. ..................... 292/161; 206/1.5; 292/41; 292/174; 354/281
[58] Field of Search ............... 292/161, 162, 157, 158, 292/167, 173, 174, 40, 41; 206/1.5, 455; 250/475.1, 480, 481; 354/281

[56] References Cited

U.S. PATENT DOCUMENTS

| 1,025,430 | 5/1912 | Sundee | 292/174 X |
| 3,215,262 | 11/1965 | Fernandez et al. | 206/1.5 |
| 3,722,236 | 3/1973 | Zelenko | 292/161 X |
| 3,842,282 | 10/1974 | Shimoda et al. | 250/481 |
| 3,958,125 | 5/1976 | Zechmair et al. | 292/162 X |
| 3,964,107 | 6/1976 | Stievenart | 250/481 X |

FOREIGN PATENT DOCUMENTS 1096741 5/1961 Fed. Rep. of Germany ...... 250/481

Primary Examiner—William E. Lyddane
Attorney, Agent, or Firm—Barnes, Kisselle, Raisch, Choate, Whittemore & Hulbert

[57] ABSTRACT

A device for opening and closing photographic cassettes or the like, which cassettes include a frame and a lid hinged to the frame. Device including a locking rod of two parts which may be moved longitudinally along one edge of the cassette by actuating means engaging the rod with the two parts thereof in longitudinal alignment or by an actuating lever pivotally secured to the cassette frame and pivotally secured to one end of one part of the two part locking rod by a lost motion connection. The device further includes hook like sets of locking elements resiliently secured to the lid along one side thereof and secured to the locking rod for automatic engagement on closure of the cassette lid which are automatically released on longitudinal movement of the locking rod against a biasing element.

9 Claims, 7 Drawing Figures

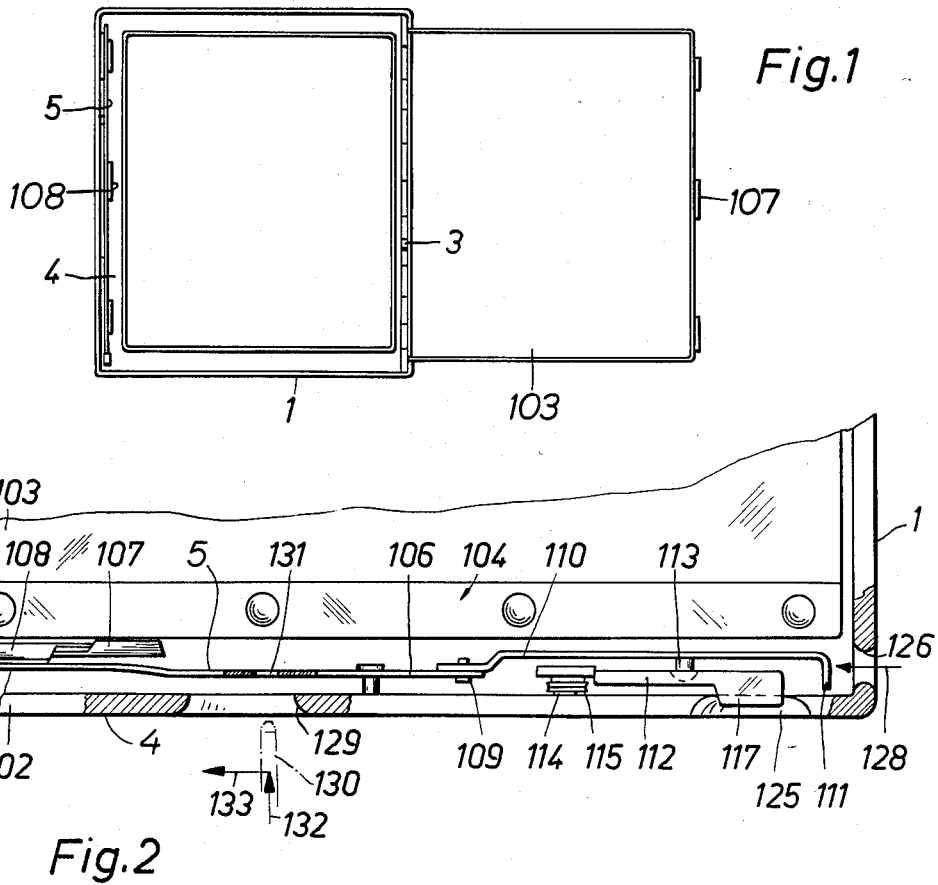
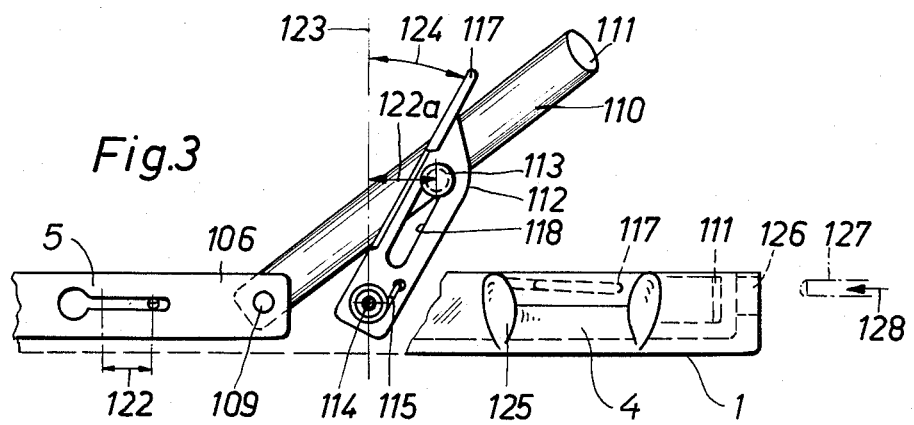

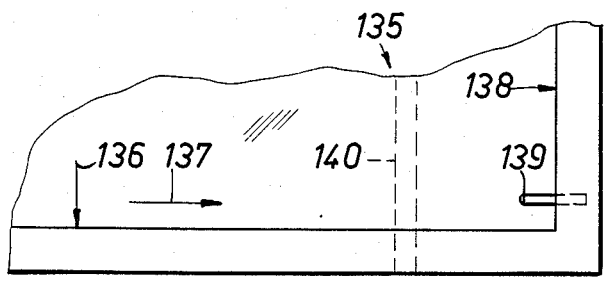
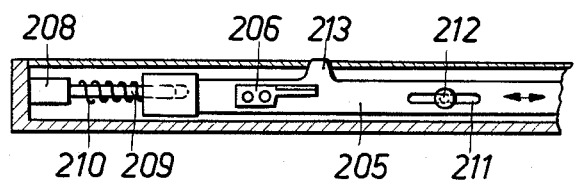
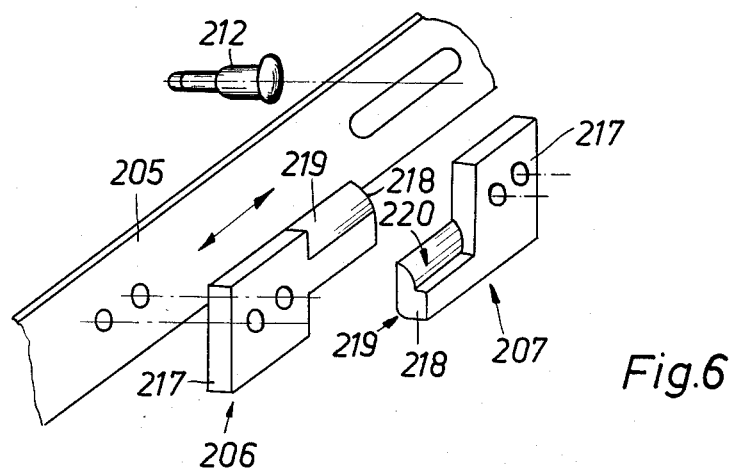
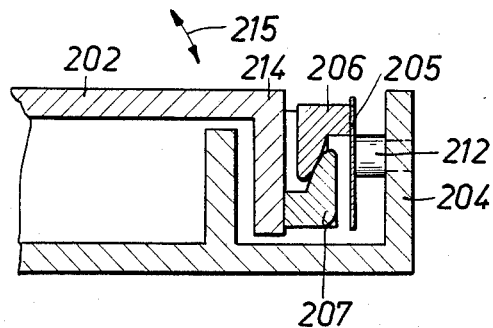

CASSETTE FASTENING STRUCTURE

This is a continuation of Application Ser. No. 164,377 filed June 30, 1980, now abandoned, which is a continuation of Application Ser. No. 029,408, filed Apr. 12, 1979, now abandoned, which is a continuation of Application Ser. No. 939,611, filed Sept. 5, 1978, now abandoned, which is a continuation of Application Ser. No. 745,679, filed Nov. 29, 1976, now abandoned.

This invention relates to a device for opening and closing photographic cassettes, in particular X-ray cassettes which are to be operated automatically, wherein between a cassette comprising a frame and a lid hinged at one longitudinal side of the frame is a closure system situated along the other longitudinal side of the frame, which closure system comprises a locking rod displaceable parallel to the longitudinal side of the frame and preloaded in one direction of displacement by spring means and having a set of locking elements which when the lid is pressed shut come into engagement with locking elements on the lid and which may be disengaged by displacement of the locking rod. A device of this kind is known for example from German Auslegeschrift 1,096,741 or from German Offenlegungsschrift 2,361,768.

In the automatic processing of exposed films, in particular X-ray films, there is an increasing demand that the device for opening and closing the cassette should be operable automatically with great reliability by simple means. In the known devices, the mechanical actuation frequently leads to difficulties and is accompanied by considerable mechanical complexity. It is also desirable that the device be so constructed that the cassette remains reliably closed even in case of rough operation, and may nevertheless be easily opened automatically, without the locking elements keeping the cassette in the closed position being exposed to appreciably attrition, i.e. without any incurred attrition on the locking elements impairing the reliable and light-proof closure of the cassette.

The present invention provides a device for opening and closing photographic cassettes, wherein between a cassette comprising a frame and a lid hinged at one longitudinal side of the frame is a closure system situated along the other longitudinal side of the frame, which closure system comprises a locking rod displaceable parallel to the longitudinal side of the frame and preloaded in one direction of displacement by spring means and having a set of locking elements which when the lid is pressed shut come into engagement with locking elements on the lid and which may be disengaged by displacement of the locking rod, and wherein in the area of the locking rod the cassette frame has excisions for insertion of an entraining element and the locking rod has engagement portions in the area of the excisions for impingement of the entraining element. A bore may be incorporated in the cassette frame in longitudinal alignment with the locking rod, for traversal by an actuating pin, while the extremity of the locking rod which is situated close to the bore may have an impingement surface extending transversely to the direction of thrust for the actuating pin.

A longitudinal opening for traversal by an actuating pin may be provided at the side of the frame parallel to the locking rod, the locking rod having an excision at the level of the longitudinal opening, for insertion of the actuating pin.

The two sets of locking elements on the locking rod and on the lid may comprise portions engageable with each other in a hook-like manner, as seen in cross-section in the closed position of the lid, these portions having a length corresponding approximately to the path of displacement of the locking rod, i.e. to the length of the excision. With this arrangement, an easy, reliable and automatic actuation of the device is obtained by insertion of an external actuating element independent of the cassette, so that easy opening by an automatic method is possible, while the lid and the cassette frame are simultaneously held in firm and light-proof manner in the closed position by the hook-shaped locking elements engaging each other in form-locked manner.

The closed position is unaffected by any spring force and is not impaired either by any attrition on the locking elements, so that the cassette and the closure device remain reliably usable for protracted periods of operation. Despite this firm and form-locked engagement of the locking elements, unaffected by springs, the device may be easily opened from the outside by mechanical actuation, the locking rod being displaceable in a stroke length corresponding to the length of the hook-shaped portions in the direction of displacement.

The invention will be further described, by way of example only, with reference to the accompanying drawings, in which:

FIG. 1 is a plan view of a cassette in accordance with the invention, in the open position;

FIG. 2 is an enlarged partial plan view of the one longitudinal side of the closed cassette, parts of the lid being illustrated cut away and parts of the cassette frame being shown in cross-section;

FIG. 3 is a side view of the arrangement shown in FIG. 2;

FIG. 4 is a partial plan view of a jig which may be used in the dark for easy opening of the cassette;

FIG. 5 is a partial vertical longitudinal cross-section of one extremity of the closure system;

FIG. 6 is an exploded perspective view of a part of the closure system; and

FIG. 7 is a cross-section on an enlarged scale through the closure device in the closed position of the cassette.

The X-ray cassette shown in FIG. 1 comprises a cassette element 1 on one longitudinal side of which a lid 103 is hinged at 3. A closure system is situated at the oppositely situated longitudinal side 4 of the cassette element 1. This closure system comprises a locking rod 5 which is displaceably located with respect to the longitudinal side 4 of the cassette element 1 and on which are situated several locking elements 108 positioned at intervals. Locking elements 107 co-operating in a catch-like manner when the lid is pressed shut are situated at the longitudinal side of the lid 103 remote from the hinged side. The lid 103 may be convexly curved with respect to the cassette element 1, so that it is deformed elastically upon being pressed shut and elastically holds the locking elements in mutual engagement in the closed position of the cassette. The cassette may, however, also have an insert of elastically yielding expanded material or separate built-in spring elements.

FIGS. 2 and 3 show a cassette frame 102 and a lid 103. The lid is in the closed position so that a locking element 108 situated on the locking rod 5 (only one locking element 8 being shown) is in the position of engagement with a corresponding locking element 107 of the lid 103.

The locking rod 5 is constructed in two parts, one locking rod section 106 being displaceably guided in its longitudinal direction only on the frame 102 of the cassette by means of slots and pins. At its free extremity, a second section 110 of the locking rod 5 is pivotal in a plane at right angles to the cassette plane, at 109. A contact surface extending transversely to the sliding direction is incorporated at the other extremity of the section 110 by means of a right-angled portion 111. The two-part construction of the locking rod is required only if, as illustrated in FIGS. 2 and 3, actuation of the locking rod is desirable by means of an actuating lever 112 which is coupled to the cassette at 114 so that it is pivotable in a plane parallel to the pivoting plane of the section 110 and is preloaded in one pivoting direction by means of a spring 115. If an actuating lever 112 is not required, the locking rod may be constructed in one piece and be guided in a longitudinally displaceable manner only, having the right-angled portion 111 at its one extremity.

The actuating lever 112 has a handle portion 117 which in the closed position is situated in an easily graspable manner in a marginal excision 125. The lever 112 also has a slot 118 in which is displaceably guided a coupling pin 113 which is firmly secured on the section 110, so that a coupling is present between the section 110 and the lever 112.

In the closed position of the device shown in FIG. 2, the right-angled portion 111 is positioned in alignment in the sliding direction with a bore 126 of the adjacent frame side. An actuating pin 127 of an automatic device for opening the closure system may be inserted through this bore, in the direction indicated by the arrow 128, until it bears on the right-angled portion 111, in order to displace the locking rod in the direction of the arrow 128 through the length of the engaging portions of the locking elements 107, 108 and thereby to open the closure system. The lid is displaced by a small amount from its closed position, so that it may easily be fully opened mechanically.

As shown in FIGS. 5 to 7, the locking rod is preloaded against an actuating device by a spring system situated at the other extremity. According to FIG. 5, a guiding pin 209 is secured, for example at 208, in the cassette frame in alignment with a locking rod 205, on which is threaded a compression spring which acts on the extremity of the locking rod 205. In FIG. 5, the locking element fastened on the locking rod is marked 205 and the longitudinal guiding system is marked 211 and 212. The locking rod 205 may also comprise an actuation extension 213. An analogous preloading system is also present in the device shown in FIGS. 2 to 4. After the opening of the cassette, the locking rod is thus automatically returned to the initial position shown in FIG. 2.

As shown in FIG. 2, a longitudinal opening 129 is incorporated at the longitudinal side of the frame 102. The locking rod section 106 has an excision 131 at the level of this opening. An actuating pin 130 of an automatic actuating system for the closure system may thus be inserted laterally and brought into engagement with the locking rod, whereupon the displacement of the locking rod for opening the closure system is performed by relative displacement of the pin 130. The relative displacements of the actuating pin 130 are indicated by arrows 132, 133. Clearly only one of the two possible means of actuation needs to be incorporated for an automatic opening system.

If the possibility of an opening action by a lever 112 is to be provided, the longitudinal displacement of the locking rod is to be performed in the arrangement shown by the actuating pins 127, 130 via the coupling 113, 118 between the section 110 and the lever 112, without this actuation being impaired by the lever 112 or without the lever being pivoted out of its idle position within the cassette as shown in FIG. 2.

If, on the other hand, the opening action is to be performed by pivoting the lever 112, the lever 112 may initially be pivoted from the idle position as shown in FIG. 2 into the position as shown in FIG. 3, without displacement of the locking rod section 106 occurring. The coupling 113, 118 thus represents a lost motion connection between the two sections. After taking up the lost motion, the locking device is opened by pivoting of the lever 112 through the angle indicated by the double-headed arrow 124. The unlocked position is reached reliably when the lever 112 reaches the vertical position indicated by the broken line 123. The pivotal angle 124 ensures a displacement path 122a of the locking rod, which is greater than the engagement length 122 of the locking elements 107, 108 in the closed position. The magnitude of the angle corresponding to the lost motion of the lever 112 is appropriately between 30° and 60°. The opening operation should be completely reliable upon reaching an angle of 90°.

Instead of an opening action of the locking system by means of an automatic device, it is possible to make use of an opening jig 135 as partially shown in FIG. 4. The jig 135 has a supporting surface for the cassette, which is delimited at one side by a longitudinal guiding system against which the cassette has its longitudinal side pushed initially in the direction indicated by the arrow 136, whereupon the cassette is displaced on the longitudinal guiding system in the direction indicated by the arrow 137 towards the transversely extending end side 138. A pin 139 thereby passes through the bore 126 and opens the locking system automatically. The jig may thus be applied in the dark for easy actuation of the locking system.

The locking elements 107 and 108 are in form-locked engagement, this engagement being free of any spring preloading.

To this end, the locking elements 206 and 207 as shown in FIG. 6 and FIG. 7 each have a plate-shaped fastening portion 217 whereby they may be fastened to the locking rod 205, which is preferably constructed as an elongate leaf spring, or on a bent-over portion 214 of the lid 202. The locking rod 205 is guided on a bent-over portion 204 of the cassette base in a longitudinal direction by slots and guiding pins 212, in such a manner that the spring-like locking rod 205 may also be deflected elastically, transverse to the direction of displacement and approximately parallel to the plane of the cassette.

A locking portion 218 which is hook-shaped as seen in cross-section projects in the sliding direction from the fastening plate 217. On its outer side, the locking portion 218 has a curved or oblique impingement surface 219 which comes into contact on the corresponding impingement surface of the co-ordinated locking element upon shutting the lid, whereby the locking rod 205 is flexed outwards elastically to the side until, upon firm pressing down of the lid, the locking elements come into mutual engagement in catch-like manner, as shown in FIG. 7. The convex or oblique inner surfaces of the hooks pull the locking sections into mutual engagement and hold the lid and cassette fast in a light-proof closed position. For opening, the locking rod is displaced in the manner already described in the direction indicated by the double-headed arrow 215 through the length of the locking portions 218, whereby the form-locked engagement of the hook-shaped locking portions is cancelled.

As shown in FIGS. 6 and 7, the locking elements are fundamentally identical in general structure but are formed in mirror-symmetry to each other, with respect to the positioning on the locking rod or on the lid.

Despite the reliable locking action, the locking elements may slide easily on each other during opening because of their design, so that only a relatively small opening force and thus displacing force is required for the locking rod 205. Even in the case of attrition of the locking elements occurring, a reliable engagement of the locking portions and thus a reliable closure of the cassette are ensured.

What we claim is:

1. A device for opening and closing photographic cassettes, which cassettes include a frame having opposite longitudinal sides and a lid hinged at one longitudinal side of the frame, comprising a closure system situated along the other longitudinal side of the frame, which closure system includes a locking rod displaceable parallel to the longitudinal side of the frame and preloaded in one direction of displacement by spring means and having a set of locking elements which when the lid is pressed shut come into engagement with a second set of locking elements on the lid and which may be disengaged by displacement of the locking rod, said locking rod being constructed in two parts and comprising a section which is guided in a longitudinally displaceable manner on the cassette frame and a section coupled pivotably on the one extremity of the first-mentioned locking rod section at right angles to the plane of the cassette, the second-mentioned locking rod section having a free extremity and being coupled via a slot and pin joint to a closure lever which is pivotally journalled on the cassette frame at right angles to its plane and wherein in the area of the locking rod the cassette frame has excisions for insertion of an entraining element and the locking rod has engagement portions in the area of the excisions, one of which is at the free extremity of the second-mentioned locking rod section, for impingement of the entraining element.

2. A device as claimed in claim 1, wherein one of the excisions incorporated in the cassette frame is in longitudinal alignment with the locking rod for traversal by an entraining member extending in longitudinal alignment with the locking rod and wherein the one engagement portion of the locking rod extends transversely to the direction of extention of the longitudinally aligned entraining member.

3. A device as claimed in claim 2, and further including a jig into which the cassette frame is insertible including a longitudinal guiding surface, an abutment surface at right angles to the guiding surface and an actuating pin on the abutment surface extending transversely thereto parallel to the guiding surface.

4. A device as claimed in claim 1, wherein one of the excisions extends longitudinally of the locking rod in the side of the frame extending parallel to the locking rod, for transversal by the entraining element and the locking rod has an excision at the level of the longitudinally extending excision, providing another of the engagement portions, for insertion of the entraining element.

5. A device as claimed in claim 1, wherein the first and second sets of locking elements on the locking rod and on the lid comprise portions engageable with each other in a hook-like manner as seen in cross-section in the closed position of the lid, the said portions having a length corresponding approximately to the path of displacement of the locking rod.

6. A device as claimed in claim 5, wherein the first and second sets of locking elements are separate and identical but are mirror-symmetry elements and are fastened on the locking rod and on the lid to yield elastically transversely to the direction of thrust on the locking rod or on the lid.

7. A device as claimed in claim 5 or 6, wherein each locking element has a plate-shaped fastening portion and an elongate locking portion of hook-shaped cross-section projecting in the direction of displacement of the locking rod.

8. A device as claimed in claim 1 wherein the slot and pin coupling joint is so constructed that in a longitudinally aligned position of the two sections of the locking rod, the locking rod is displaceable as a unit in a longitudinal direction with respect to the closure lever the latter being freely pivotable through an angle less than 90° under entrainment of the pivotable second-mentioned locking rod section and without displacement of the first-mentioned locking rod section.

9. A device as claimed in claim 1 wherein the engagement length of the locking elements is smaller than the entrainment path of the coupling pin as far as a position of the closure lever approximately at right angles to the cassette plane.

* * * * *